United States Patent [19]
Fendt et al.

[11] Patent Number: 5,929,535
[45] Date of Patent: Jul. 27, 1999

[54] RESTRAINT SYSTEM IGNITION CIRCUIT OUTPUT STAGE

[75] Inventors: Günter Fendt; Peter Hora; Norbert Müller, all of Schrobenhausen, Germany

[73] Assignee: TEMIC TELEFUNKEN microelectronic GmbH, Heilbronn, Germany

[21] Appl. No.: 08/877,815

[22] Filed: Jun. 18, 1997

[30] Foreign Application Priority Data

Jun. 19, 1996 [DE] Germany .............................. 196 24 357

[51] Int. Cl.$^6$ ............................................. B60R 16/02
[52] U.S. Cl. ........................ 307/10.6; 307/10.1; 701/45; 180/268; 180/271
[58] Field of Search .................................... 307/9.1, 10.1, 307/10.6; 180/268, 271; 280/728.1; 364/925; 477/99; 701/45

[56] References Cited

U.S. PATENT DOCUMENTS

| | | | |
|---|---|---|---|
| 4,433,390 | 2/1984 | Carp et al. | 364/925 |
| 5,188,069 | 2/1993 | Fiorenza | 477/99 |
| 5,309,030 | 5/1994 | Schultz | 307/10.1 |
| 5,420,790 | 5/1995 | Ravas et al. | 307/10.1 |
| 5,461,358 | 10/1995 | Ravas, Jr. et al. | 307/10.1 |
| 5,506,775 | 4/1996 | Tsurushima et al. | 307/10.1 |
| 5,554,890 | 9/1996 | Kinoshita | 307/10.1 |
| 5,596,497 | 1/1997 | Honda | 307/10.1 |

FOREIGN PATENT DOCUMENTS

| | | |
|---|---|---|
| 0577988 | 1/1994 | European Pat. Off. . |
| 2021475 | 11/1971 | Germany . |
| 4210861 | 10/1992 | Germany . |
| 4441184 | 6/1995 | Germany . |

*Primary Examiner*—Albert W. Paladini
*Attorney, Agent, or Firm*—Venable; George H. Spencer; Norman N. Kunitz

[57] ABSTRACT

An ignition circuit output stage which is driven by one or several microprocessors. Up to now different modes of operation each required their own different ignition circuit output stage. The ignition circuit output stage according to the invention is programmable - that is, using one and the same output stage, different modes of operation can be selected such as, for example, the unregulated or output stage mode as well as the regulated and limited output current mode. The circuit essentially consists of a down converter which, when activated, will regulate and limit the discharge current. The down converter can be activated and deactivated by means of an appropriate signal. When the down converter is in its deactivated state, an unregulated discharge takes place; this is the output stage mode. With the programmable output stage it is possible to select the best mode of operation for the relevant application case—such as, for example, operation without inductance as well as energy supplied directly from the onboard battery—without different output stage ICs being required.

5 Claims, 1 Drawing Sheet

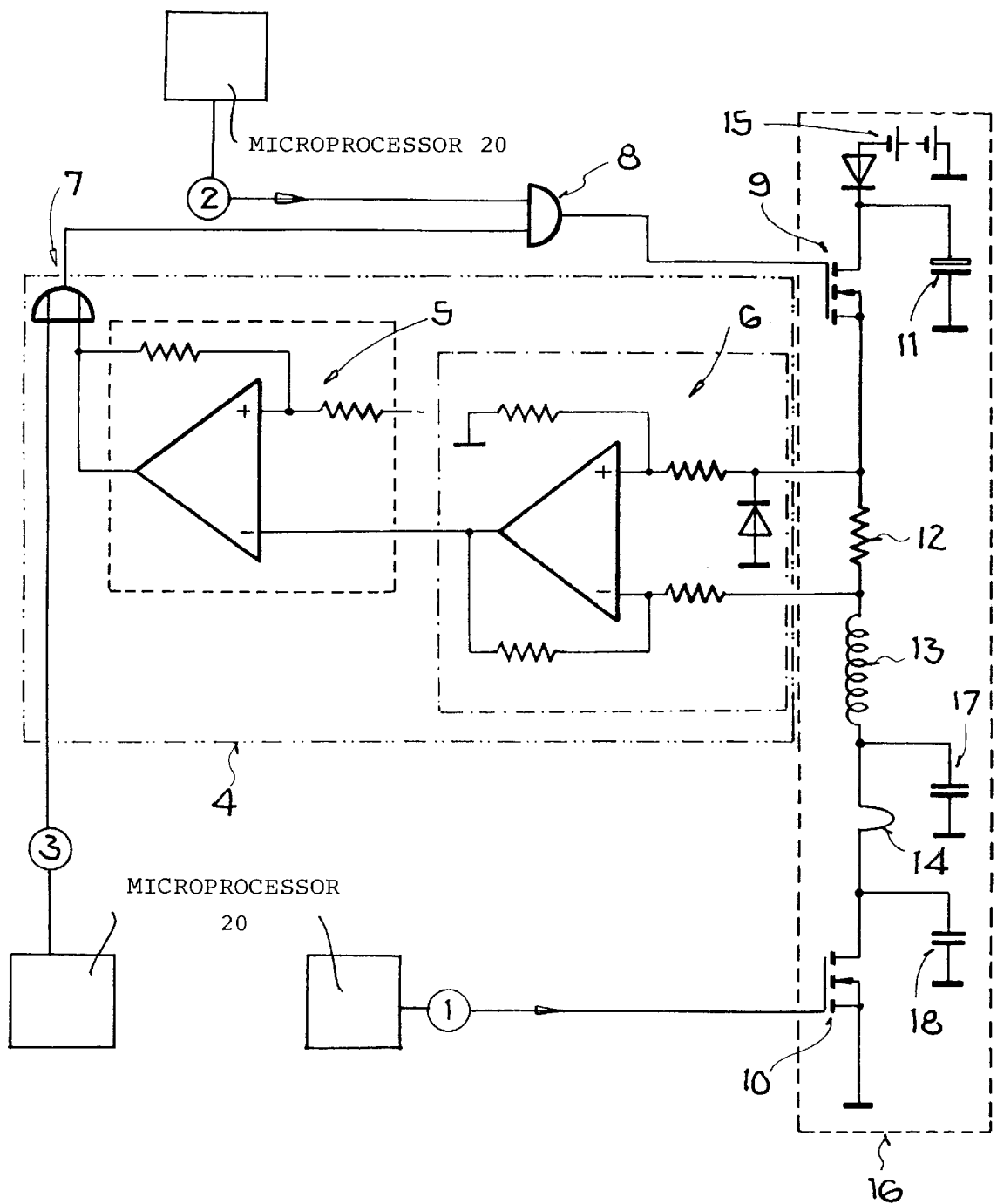
FIG.

RESTRAINT SYSTEM IGNITION CIRCUIT OUTPUT STAGE

BACKGROUND OF THE INVENTION

The invention concerns an ignition circuit output stage for vehicle occupant protection systems.

In motor vehicles there are trigger devices for protective safety systems such as belt pretensioning systems and airbag systems. By means of an accelerometer, all trigger-relevant data will be evaluated and stored via an analog/digital converter in a microprocessor complete with storage devices. These information data are exchanged and reviewed with an ignition and network control system, even among each other, in order to trigger—when required—the various individual safety systems at the correct point in time. A protective safety device is usually triggered by means of an ignition squib which is driven by an ignition output stage. The squib contains a wire which heats up when a current flows and in this way causes an ignition event to take place. As a result of cost reduction measures, in future the squibs of the gas generators are to be supplied directly from the vehicle battery according to present knowledge and understanding. If the gas generator in question is a particularly safety-relevant gas generator such as the driver airbag, a backup supply capacitor must be integrated additionally; this capacitor continues to supply energy to the system, even if the vehicle battery or its supply line are damaged in the event of a crash.

In the present generation of airbag control devices, the ignition circuit output stages are implemented as "through connect output stages". A through connect output stage is defined as a standard ignition output stage where in the event of an ignition taking place, two switches are closed simultaneously such that the ignition squib(s) is (are) supplied with the entire energy available. Here, for economic reasons, ignition is effected directly from the onboard battery, in some cases also from a spare capacitor kept in reserve. For each safety-relevant ignition a separate capacitor is required as the discharge will be neither regulated nor limited. In fixture generations of airbag control devices, however, only one spare capacitor will be provided for several generators. These systems, therefore, require other ignition circuit output stages complete with "regulated and limited output current mode". In this case only a limited amount of energy will be passed to each ignition squib in a regulated way.

However, the disadvantage of present ignition circuit output stages is that for each mode of operation (output stage mode or regulated and limited output current mode) another output stage is required.

SUMMARY OF THE INVENTION

The object of the invention is to provide different modes of operation using just one ignition circuit output stage.

According to the invention there is a programmable ignition circuit output stage in which these various different operating modes can be preset. Advantageous further applications of the invention result from dependent claims. Here, a current down converter is integrated into the output stage according to the invention.

The advantages achieved by means of the invention consist in particular in that a programmable ignition circuit output stage allows adaptation to the respective situation or environment such that the requirements made of the system can always be implemented with the least cost in terms of resources. If, for example, it is not required that an ignition circuit is provided with its own energy reserve, it will always be the more cost favorable unregulated ignition supplied by the board battery that is chosen for reasons of economic efficiency. With the programmable output stage—which is capable of both modes of operation—it is thus always possible to implement the more favorable solution without all these various different output stage ICs being required. The fact that different ICs are not required here will cause a reduction in costs and component complexity in connection with an increase of the number of pieces manufactured.

The invention is to be elucidated by means of FIG. 1.

BRIEF DESCRIPTION OF THE DRAWINGS

FIG. 1 shows an example of an ignition circuit output stage according to this invention.

DESCRIPTION OF THE PREFERRED EMBODIMENTS

The programmable ignition circuit output stage essentially consists—as shown in FIG. 1—of a current down converter which is implemented by means of an appropriate logic 4 and the ignition circuit 16 which are interconnected via an AND operation 8. The inputs 1, 2, 3 are controlled by one or several microprocessors 20. Before the ignition squib or device 14 can be triggered at all by means of an appropriately high current flow or voltage impulse, the two switches 9, 10 connected in series with the squib 14 must be closed. This is effected by feeding—independent of each other—a HIGH signal for the first switch 10 into input 1 and a HIGH signal for the second switch 9 into input 2. Now, two different signals HIGH or LOW can be fed into control input 3 in order to control the mode of operation of the output stage. In the description, a HIGH signal corresponds to a logical ONE or an active signal. A LOW signal corresponds to logical ZERO.

The onboard battery 15 as well as a capacitor 11 can both be used as the energy accumulator or store which supplies the trigger unit with the energy required.

The following examples illustrate the operation of the output storage depending on the signal applied to input 3.

EXAMPLE 1

The signal LOW is applied to control input 3.

Via OR operation 7, a HIGH signal will be passed to the AND operation 8 only if a HIGH signal is applied to the other input of the OR operation 7. If the signal HIGH is also applied to the other input of the AND operation 8—which signal comes from input 2 and is to close switch 9—then the HIGH signal will be passed to switch 9, closing the same. Now, if switch 10 has also been closed by a corresponding signal at input 1, then—for instance—the supply capacitor 11 which is charged to 50 V will discharge. A current begins to flow through resistor 12 and a signal proportional to this current, as determined by the voltage accross resistor 12, will arrive at an input of a Schmitt trigger 5, via a differential amplifier circuit 6.

In the example shown here, the Schmitt trigger 5 is to have the following characteristics:

$U_{on}$=2 V→1 A
→∅=2.5 A
$U_{OFF}$=8 V→4 A

That is, for a regulated average current of 2.5 A through the resistor 12, a HIGH signal $U_{on}$ is produced at the output of the Schmitt trigger 5 when it receives an input signal of 2 v corresponding to a current of 1 A through resistor 12, and a LOW signal $U_{OFF}$ is produced at the output of the Schmitt trigger 5 when it receives an input signal of 8 v corresponding to a current of 4 A through the resistor 12. The amplifier 6 serves to adjust the voltage measured across the resistor 12 to the range required by the Schmitt trigger 5.

On the other hand, this current builds up a magnetic field in a coil 13. The coil 13 here serves as an intermediate energy accumulator or store and is a part of the down-converter circuit.

If the average current now increases beyond 2.5 A to 4 A, the Scumitt trigger 5 will feed a LOW signal to OR operation 7. A HIGH signal will then be applied at one input of the AND operation 8 only. As a result, switch 9 is reopened. There will be no further discharge of supply capacitor 11 or onboard battery 15. The current then will fall below 2.5 A to 1 A. Via differential amplifier 6, a signal of 2 v will then be applied to the input of Schmitt trigger 5 which will then be switched back on i.e., produces a HIGH output signal $U_{ON}$; a HIGH signal is generated at OR operation 7 as well as at AND operation 8, and thus switch 9 is re-activated. Supply capacitor 11 or onboard battery 15 will discharge again. Switch 9 thus is pulsed. Due to the pulsing of switch 9, the average current which can flow through the ignition squib 14 will be regulated down to 2.5 A (for example). The system runs in a regulated and limited output current operation mode. Via the auxiliary capacitors 17 and 18, the voltage existing at ignition squib 14 is detected.

EXAMPLE 2

The signal HIGH is applied to control input 3.

Via the OR operation 7, the HIGH signal from input 3 will always be passed to the AND operation 8—irrespective of the signal at the other input of these OR operations. If the signal HIGH is also applied to the other input of AND operation 8—which signal comes from input 2—then the switch 9 will be closed. Now, if switch 10 has also been closed by a corresponding signal at input 1, then the supply capacitor 11 will discharge without regulation or there will flow an unregulated current from onboard battery 15 in an unregulated or the output stage. The system operates in through-connect output stage mode. An inductance 13 is not required i.e., it serves no required purpose in this mode of operation.

What is claimed is:

1. In an ignition circuit output stage used to trigger vehicle occupant protection systems for motor vehicles, which ignition circuit output stage is driven by at least one microprocessor, and whose ignition device, in a trigger situation, is supplied with the trigger energy from an energy accumulator, which is one of an onboard battery and a capacitor, the improvement wherein this ignition circuit output stage includes circuit means, responsive to a signal from at least one microcomputer for permitting a programmed selection of the following operating modes:

an output stage mode where the ignition device is supplied from the energy accumulator without regulations; or an output stage complete with regulated and limited output current mode where a limited regulated amount of energy is supplied by the energy accumulator.

2. Ignition circuit output stage according to claim 1 wherein, in the regulated and limited output current mode, the voltage from the energy accumulator is regulated down, by a current down converter.

3. Ignition circuit output stage according to claim 1 wherein, in the regulated and limited output current mode operation of the ignition circuit output stage, a switch in an energy supply path including the ignition device is pulsed in relation to the current value flowing through the ignition device, whereby the current is regulated and limited.

4. Ignition circuit output stage according to claim 1 wherein, the programmed selection of the ignition circuit output stage is effected by supplying an input signal which has one of two different binary states to the output stage.

5. An ignition circuit output stage used to trigger vehicle occupant protection systems comprising in combination:

a series connection of a resister, an inductance and an ignition device connected between a first and a second switch across an energy accumulator which is at least one of a battery and a capacitor;

a first control signal input connected to one of said switches to control the open and closed states of the one of said switches in response to an input signal supplied thereto;

a second control signal input connected to a first input of an AND operation whose output is connected to the other of said switches to control the open and closed states of the other of said switches in response to an input signal supplied to the second control input;

circuit means, having an input connected to provide a signal proportional to current flowing through said resister and an output connected via an OR operation to a second input of said AND operation, for regulating a current flowing through said resister to a desired value; and, a third control signal input connected to a second input of said OR operation, whereby a regulated and limited current will flow through said series connection when the input control signals at said first and second inputs are of the same binary state and the input control signal at said third control signal input is of the opposite binary state, and an unregulated current will flow said series connection when the input control signals at said first, second and third signal inputs are of the same binary state.

* * * * *